United States Patent [19]

Gibbons

[11] 3,859,075

[45] Jan. 7, 1975

[54] ISOXAZOLPYRIMIDINE HERBICIDES AND METHOD OF CONTROLLING PLANT GROWTH

[75] Inventor: Loren Kenneth Gibbons, Medina, N.Y.

[73] Assignee: FMC Corporation, New York, N.Y.

[22] Filed: Aug. 30, 1973

[21] Appl. No.: 392,949

Related U.S. Application Data

[62] Division of Ser. No. 189,779, Oct. 15, 1971, Pat. No. 3,803,148.

[52] U.S. Cl. .................................................. 71/92
[51] Int. Cl. ............................................. A01n 9/22
[58] Field of Search ........................................ 71/92

[56] References Cited
UNITED STATES PATENTS 3,080,364  3/1963  Schroeder et al. ...................... 71/90
3,707,364  12/1972  Becke et al. ............................ 71/90

*Primary Examiner*—Lewis Gotts
*Assistant Examiner*—Catharine L. Mills

[57] ABSTRACT

A new class of herbicidal compounds consisting of 3,-6-dialkylisoxazolo[3,4-d]pyrimidin-4-ones exhibits pre-emergence and post-emergence herbicidal activity, controlling effectively a wide spectrum of grassy and broad-leafed plant species at rates below one-half pound per acre. The synthesis of members of this class is described in detail, and the utility of representative compounds is exemplified.

22 Claims, No Drawings

ISOXAZOLPYRIMIDINE HERBICIDES AND METHOD OF CONTROLLING PLANT GROWTH

This is a division of application Ser. No. 189,779, filed Oct. 15, 1971, now issued as U.S. Pat. No. 3,803,148.

BACKGROUND OF THE INVENTION

1. Field of the Invention

This invention pertains to the general field of herbicides, and particularly to compositions which control plant growth.

2. Description of the Prior Art

Analogous herbicidal compounds are described in copending U.S. patent applications Ser. No. 31,414, filed Apr. 23, 1970, now U.S. Pat. No. 3,679,682 and Ser. No. 189,780 and Ser. No. 189,781, filed of even date herewith, now U.S. Pat. Nos. 3,816,420 and 3,816,421 respectively.

Neither the isoxazolo[3,4-d]pyrimidin-4-one compounds of the present invention, nor the outstanding plant responses in pre-emergence and post-emergence herbicidal activity of the compounds of the present invention, have been previously reported or suggested in the art.

SUMMARY OF THE INVENTION

This invention relates to novel herbicidal compounds, to new herbicidal compositions, and to new methods for the control of undesired plant growth by pre-emergence and post-emergence application of said new and useful herbicidal compositions.

The novel herbicidal compounds of this invention are substituted isoxazolopyrimidines. The structure of these compounds is given in the following formula:

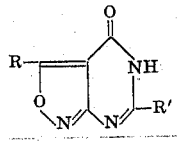

in which R and R' may be the same or different members of the group consisting of straight or branched lower aliphatic radicals (1 to 4 carbon atoms).

Preferred herbicidal isoxazolopyrimidines of this invention are those compounds in which both R and R' are hydrocarbon radicals. Particularly preferred are those compounds in which one of R and R' is isopropyl or tert-butyl, and the other is a hydrocarbon radical of 1 to 3 carbon atoms or tert-butyl.

Effective herbicidal control of the growth of a wide variety of grassy and broad-leafed plant species is obtained at rates below one-half pound per acre. The herbicidal compositions may be applied and utilized by commonly accepted methods.

DETAILED DESCRIPTION OF THE INVENTION AND THE PREFERRED EMBODIMENTS

The new class of herbicidal compounds of this invention has the formula

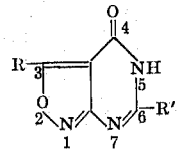

in which R and R' may be the same or different members of the group consisting of straight or branched lower aliphatic radicals (1 to 4 carbon atoms).

The preparation of the new isoxazolopyrimidines of this invention may be conveniently carried out from readily available materials. Methods of synthesis are illustrated by the following schema wherein a herbicidal isoxazolopyrimidine of the invention is designated V, and R and R' have the significance set forth above:

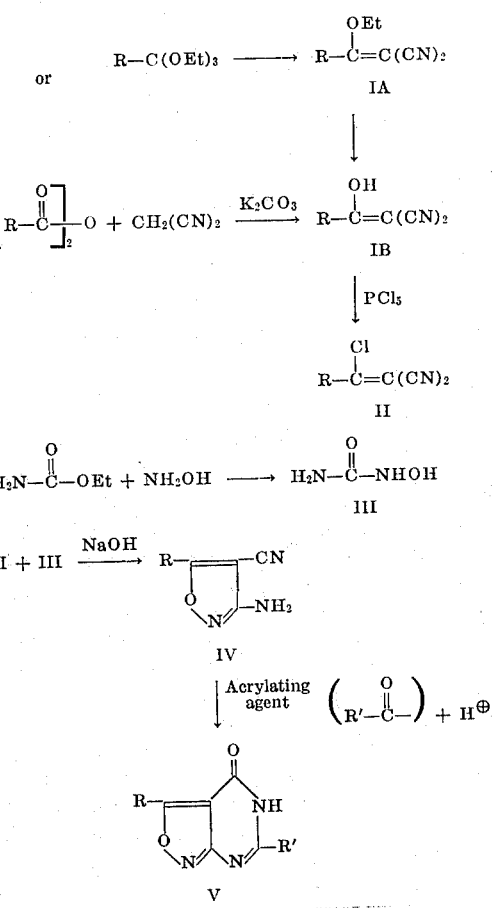

The preparation of many of the intermediates used in the synthesis of the isoxazolopyrimidines of this invention have not previously been described. In order that the new compounds of this invention may be readily available to those skilled in the art, the methods for preparation of those intermediates used in the examples are set forth below. The examples describing the synthesis of the isoxazolopyrimidines follow the description of the preparation of the intermediates. All temperatures are in degrees centigrade. All reduced pressures not otherwise designated are the reduced pressure attainable using a water aspirator.

The intermediate alkenenitriles (IA of the schema) can be prepared by the reaction of malononitrile with the appropriate trialkyl orthoalkanoate to give the corresponding 2-cyano-3-alkoxy-2-alkenenitrile. This procedure has been described by Taylor and Garcia (J. Org. Chem. 29, 2166 (1964) who prepared 2-cyano-3-ethoxy-2-pentenenitrile , and 2-cyano-3-ethoxy-2-butenenitrile in this manner. The alkoxy compound can be then converted to the corresponding 3-hydroxy compound (IB of the schema) by alkaline hydrolysis. Alternatively the 2-cyano-3-hydroxy-2-alkenenitrile may be prepared by the reaction of malononitrile with the appropriate acid anhydride in the presence of potassium carbonate, as in the following Example:

EXAMPLE I

Preparation of 2-Cyano-3-hydroxy-2-hexenenitrile

A solution of 132.1 g of malononitrile in 2½ liters of anhydrous ether was placed in a 5-liter 3-neck flask equipped with mechanical stirrer, thermometer, additional funnel and condenser with drying tube. To this was added 331.7 g of potassium carbonate and the mixture was stirred for 5 minutes before beginning addition of butyric anhydride. During a 2-hour period, 506.2 g of butyric anhydride was slowly added, the reaction being exothermic. The reaction mixture was refluxed for 1 hour, cooled to about 15°C and poured over 1½ liters of ice-water. The aqueous solution was acidified with concentrated hydrochloric acid and then extracted with ether. The ethereal extract was washed with saturated sodium chloride solution, dried ($Na_2SO_4$) and concentrated under reduced pressure at room temperature. The product was isolated by distillation using a "falling film" molecular still (column temperature 85°–90° and pressure of 17 mm Hg) to give 76.5 g of 2-cyano-3-hydroxy-2 -hexenenitrile which was used without further purification. The ir and nmr spectra were consistent with the assigned structure. Recrystallization of a small amount from another run, using benzene-ligroin (30°–60°), gave a solid, m.p. 63°–64.5°.

Additional compounds prepared by this method were: 2-cyano-3-hydroxy-4-methyl-2-pentenenitrile, m.p. 93°–95°; 2-cyano-3-hydroxy-4,4-dimethyl-2-pentenenitrile, m.p. 164°–166°.

The corresponding 3-chloro-2-cyano-2-alkenenitrile (II of the schema) was prepared by treating the 3-hydroxy compound (IB) with phosphorus pentachloride, according to the procedure in the Example below.

EXAMPLE II

Preparation of 3-Chloro-2-cyano-2-hexenenitrile

A solution of 49.5 g of 2-cyano-3-hydroxy-2-hexenenitrile in 500 ml of benzene was placed in a one-liter flask equipped with mechanical stirrer, gas trap and condenser with drying tube. The solution was cooled with an ice-bath and 75.7 g of phosphorus pentachloride was added, in portions, over a 15 minute period. The mixture was stirred for 3 hours at about 5° and stirred at room temperature overnight. After refluxing for 1 hour, the mixture was cooled to about 5°, sulfur dioxide gas was passed through the mixture for 45 minutes and the mixture was stirred for an additional 2 hours at 5°. The mixture was allowed to warm and then was concentrated at 35° under reduced pressure to remove volatile materials. Product was collected by distillation to give 35 g of 3-chloro-2-cyano-2-hexenenitrile, b.p. 100°–110°C/18 mm Hg. The identity of the product was verified by its nmr spectrum.

Additional compounds prepared by this method were: 3-chloro-2-cyano-2-butenenitrile, b.p. 96°–98°/27 mm Hg; 3-chloro-2-cyano-2-pentenenitrile, b.p. 91°–92°/18 mm Hg; 3-chloro-2-cyano-4-methyl-2-pentenenitrile, b.p. 97°–99°/17 mm Hg; 3-chloro-2-cyano-4,4-dimethyl-2-pentenenitrile, m.p. 54°, b.p. 115°–116°/15 mm Hg.

N-Hydroxyurea (III of the schema) was prepared as follows: A solution of 400 g of sodium hydroxide in 2 liters of water was placed in a 5-liter flask equipped with mechanical stirrer and condenser. In this was dissolved 416 g of hydroxylamine hydrochloride after which 445.2 g of ethyl carbamate were added and the reaction mixture was stirred at room temperature for about 24 hours. The solution was chilled, neutralized by concentrated hydrochloric acid and then washed with a liter of ether. Solvent was evaporated from the aqueous solution under reduced pressure and the residue was washed with hot ethanol. The residue was then extracted with ethanol in a Soxhlet apparatus for about 48 hours. The alcoholic extract was concentrated under reduced pressure to a solid. The solids recovered from alcoholic extraction were recrystallized from ethanol and dried to give 180 g of N-hydroxyurea; m.p. 142°–144°. An additional 76.4 g of product were recovered from recrystallization filtrates.

This material was then reacted with a 3-chloro-2-cyano-2-alkenenitrile (II) to produce the corresponding 3-amino-4-cyano-5-alkylisoxazole (IV of the schema), as in the following Example:

EXAMPLE III

Preparation of 3-Amino-4-cyano-5-propylisoxazole

To a solution of 2.8 g of sodium hydroxide in 30 ml of water, in a 100 ml flask equipped with mechanical stirrer, condenser and addition funnel, was added 5.3 g of N-hydroxyurea. A solution of 10.8 g of 3-chloro-2-cyano-2-hexenenitrile in 5 ml of ethanol was added slowly while maintaining the temperature of the reaction mixture below 30°. The reaction mixture was stirred overnight at room temperature and then refluxed for one hour. The mixture was cooled to room temperature and the product isolated by filtration. The solid was dissolved in hot ethanol and the solution treated with decolorizing charcoal. The solution was cooled slowly to room temperature and the solid which separated was isolated by filtration. Recrystallization from ethanol-water (1:1) gave 3-amino-4-cyano-5-propylisoxazole; m.p. 105°–107°. Additional product (m.p. 104°–106°) was obtained from the recrystallization filtrate to give a total of 4.5 g of product. The identity was verified by the nmr spectrum.

Analysis: Calc'd for $C_{10}H_{13}N_3O_2$: C 57.96; H 6.32; N 20.28
Found: C 57.68; H 6.30; N 20.33

Also prepared by this reaction were: 3-amino-4-cyano-5-methylisoxazole, m.p. 173°–174°; 3-amino-4-cyano-5-ethylisoxazole, m.p. 109°–112°; 3-amino-4-cyano-5-isopropylisoxazole, m.p. 64°–65°; 3-amino-4-cyano-5-tert-butylisoxazole, m.p. 87°–88°.

The isoxazolopyrimidines of the present invention (V in the schema) were prepared by reaction of these intermediates (IV) with the appropriate acid anhydride or acid chloride, as in the Examples below.

EXAMPLE IV

6-Ethyl-3-propylisoxazolo[3,4-d]pyrimidin-4(5H)-one

A mixture of 1 g of 3-amino-4-cyano-5-propylisoxazole and 5 ml of propionic anhydride was cooled to 5°. To this was added slowly 1 ml of concentrated sulfuric acid, and the reaction mixture was heated at 100° for 1 hour. The hot mixture was poured onto 25 ml of ice water and stirred for 1 hour. The solid product was collected, washed with cold water, recrystallized from ethanol, washed with cold water again and dried. Additional product was obtained by addition of water to the alcoholic filtrate to give a total of 0.6 g of 6-ethyl-3-propylisoxazolo-[3,4-d]pyrimidin-4(5H)-one; m.p. 151°–153°. The ir and nmr spectra of the product were consistent with this assigned structure.

Analysis: Calc'd for $C_{10}H_{13}N_3O_2$: C 57.96; H 6.32; N 20.28
Found: C 57.68; H 6.30; N 20.33

EXAMPLE V

6-Isopropyl-3-propylisoxazolo[3,4-d]pyrimidin-4(5H)-one

By the method of Example IV, 2 ml of sulfuric acid was added to a mixture of 2.0 g of 3-amino-4-cyano-5-propylisoxazole and 10 ml of isobutyric anhydride. The reaction mixture was treated as in Example IV to give 1.0 g of 6-isopropyl-3-propylisoxazolo[3,4-d]pyrimidin-4(5H)-one; m.p. 134°–136°. The nmr spectrum of the product was consistent with this assigned structure.

Analysis: Calc'd for $C_{11}H_{15}N_3O_2$: C 59.71; H 6.83; N 18.99
Found: C 59.64; H 6.62; N 19.29

EXAMPLE VI 6-tert-Butyl-3-propylisoxazolo[3,4-d]pyrimidin-4(5H)-one

By the method of Example IV, 2 ml of sulfuric acid was added to a mixture of 2.3 g of 3-amino-4-cyano-5-propylisoxazole and 11 ml of trimethylacetyl chloride. The mixture was heated at 100° for 2 hours; unreacted trimethylacetic acid was removed by distillation at 150°/20 mm Hg. The residue was poured into 50 ml of ice water. The solid was collected by filtration, washed with water and recrystallized from ethanol to give 15. g of 6-tert-butyl-3-propylisoxazolo[3,4-d]pyrimidin-4(5H)-one; m.p. 165°–166°. The nmr spectrum was consistent with this assigned structure.

Analysis: Calc'd for $C_{12}H_{17}N_3O_2$: C 61.26; H 7.28; N 17.86
Found: C 61.78; H 7.24; N 17.84

EXAMPLE VII 6-tert-Butyl-3-ethylisoxazolo[3,4-d]pyrimidin-4(5H)-one

A mixture of 2.9 g of 3-amino-4-cyano-5-ethylisoxazole and 15 ml of trimethylacetyl chloride was chilled to about 5° in a 25 ml flask equipped with stirring bar, condenser and drying tube. To this was added slowly 3 ml of concentrated sulfuric acid. The mixture was heated at 100° for 1 hour and then at 135° for 1 hour. Volatile components were removed under reduced pressure at 150° and the residue was poured into 40 ml of ice water. After the ice had melted, the solid was collected by filtration, washed with water and recrystallized from ethanol-water to give 2.1 g of 6-tert-butyl-3-ethylisoxazolo[3,4-d]-pyrimidin-4(5H)-one; m.p. 189°–190°. The nmr spectrum of the product was consistent with the assigned structure.

Analysis: Calc'd for $C_{11}H_{15}N_3O_2$: C 59.71; H 6.83; N 18.99
Found: C 58.98; H 6.91; N 18.45

EXAMPLE VIII

6-Ethyl-3-isopropylisoxazolo[3,4-d]pyrimidin-4(5H)-one

By the method of Example VII, 4 g of 3-amino-4-cyano-5-isopropylisoxazole was reacted with 20 ml of propionic anhydride. The solid was recrystallized from ethanol three times to give 2.2 g of 6-ethyl-3-isopropylisoxazolo[3,4-d]pyrimidin-4(5H)-one; m.p. 163°–164°. The nmr spectrum was consistent with the proposed structure.

Analysis: Calc'd for $C_{10}H_{13}N_3O_2$: C 57.96; H 6.32; N 20.28
Found: C 57.93; H 6.34; N 20.10

EXAMPLE IX 3,6-Diisopropylisoxazolo[3,4-d]pyrimidin-4(5H)-one

By the method of Example VII, 4.6 g of 3-amino-4-cyano-5-isopropylisoxazole was reacted with 20 ml of isobutyric anhydride for 1 hour at 100° in the presence of 3 ml of concentrated sulfuric acid. The solid was recrystallized from ethanol to give 3.0 g of 3,6-diisopropylisoxazolo[3,4-d]pyrimidin-4(5H)-one; m.p. 149°–150°. The nmr spectrum was consistent with the assigned structure.

Analysis: Calc'd for $C_{11}H_{15}N_3O_2$: C 59.71; H 6.83; N 18.99
Found: C 59.90; H 6.78; N 19.08

EXAMPLE X 6-tert-Butyl-3-isopropylisoxazolo[3,4-d]pyrimidin-4(5H)-one

By the method of Example VII, 4.3 g of 3-amino-4-cyano-5-isopropylisoxazole was reacted with 20 ml of trimethylacetyl chloride. The product was recrystallized from ethanol to give 4.0 g of 6-tert-butyl-3-isopropylisoxazolo[3,4-d]pyrimidin-4(5H)-one; m.p. 218°–219°. The nmr spectrum was consistent with the assigned structure.

Analysis: Calc'd for $C_{12}H_{17}N_3O_2$: C 61.26; H 7.28; N 17.86
Found: C 61.34; H 7.16; N 17.85

EXAMPLE XI 3-tert-Butyl-6-methylisoxazolo[3,4-d]pyrimidin-4(5H)-one

By the method of Example VII, 5 g of 3-amino-5-tert-butyl-4-cyanoisoxazole was reacted with 20 ml of acetic anhydride. The product was recrystallized from ethanol-water to give 2.2 g of 3-tert-butyl-6-methylisoxazolo[3,4-d]pyrimidin-4(5H)-one; m.p. 194°–195°. The nmr spectrum of the product was consistent with the assigned structure.

Analysis: Calc'd for $C_{10}H_{13}N_3O_2$: C 57.96; H 6.32; N 20.28
Found: C 58.03; H 6.09; N 20.03

EXAMPLE XII 3-tert-Butyl-6-ethylisoxazolo[3,4-d]pyrimidin-4(5H)-one

By the method of Example VII, 5 g of 3-amino-5-tert-butyl-4-cyanoisoxazole was reacted with 20 ml of propionic anhydride to give 3.6 g of 3-tert-butyl-6-ethylisoxazolo[3,4-d]pyrimidin-4(5H)-one; m.p. 145°–146°. The nmr spectrum of the product was consistent with the assigned structure.

Analysis: Calc'd for $C_{11}H_{15}N_3O_2$: C 59.71; H 6.83; N 18.99
Found: C 59.47; H 6.74; N 18.85

EXAMPLE XIII 3,6-Di-tert-butylisoxazolo[3,4-d]pyrimidin-4(5H)-one

By the method of Example VII, 5 g of 3-amino-5-tert-butyl-4-cyanoisoxazole was reacted with 20 ml of trimethylacetyl chloride. By-product acid was removed by distillation, and the reaction mixture was diluted with water. Precipitated product was collected and recrystallized from ethanol to give 3.4 g of 3,6-di-tert-butylisoxazolo[3,4-d]pyrimidin-4(5H)-one; m.p. 265°–266°. The nmr spectrum of the product was consistent with the assigned structure.

Analysis: Calc'd for $C_{13}H_{19}N_3O_2$: C 62.63; H 7.68; N 16.85
Found: C 62.99; H 7.49; N 16.56

The following additional compounds of the invention were prepared by methods exemplified above:

Example XIV — 3-tert-butyl-6-propylisoxazolo-[3,4-d]pyrimidin-4(5H)-one, m.p. 145°–146°;

Example XV — 3-tert-butyl-6-isopropylisoxazolo-[3,4-d]pyrimidin-4(5H)-one, m.p. 184°–186°;

Example XVI — 3,6-diethylisoxazolo[3,4-d]pyrimidin-4(5H)-one, m.p. 185°–186°;

Example XVII — 3-ethyl-6-isopropylisoxazolo-[3,4-d]pyrimidin-4(5H)-one, m.p. 156°–157°.

Example XVIII — 3-ethyl-6-methylisoxazolo[3,4-d]pyrimidin-4(5H)-one, m.p. 225°–227°;

Example XIX — 6-tert-butyl-3-methylisoxazolo-[3,4-d]pyrimidin-4(5H)-one, m.p. 201°–203°;

Example XX — 6-isopropyl-3-methylisoxazolo-[3,4-d]pyrimidin-4(5H)-one, m.p. 211°–213°;

Example XXI — 3-ethyl-6-propylisoxazolo[3,4-d]pyrimidin-4(5H)-one, m.p. 174°–175°;

Example XXII — 3-methyl-6-propylisoxazolo-[3,4-d]pyrimidin-4(5H)-one, m.p. 216°–217°;

Example XXIII — 3-isopropyl-6-methylisoxazolo-[3,4-d]pyrimidin-4(5H)-one, m.p. 202°–203°;

Example XXIV — 3,6-dimethylisoxazolo[3,4-d]pyrimidin-4(5H)-one, m.p. 265°–266°;

Example XXV — 6-ethyl-3-methylisoxazolo[3,4-d]pyrimidin-4(5H)-one, m.p. 249°–250°.

The biological activity of the compounds of this invention was demonstrated in standard herbicidal tests. The test methods and test results were as follow:

For pre-emergence herbicidal tests the test crop seeds of lima beans (*Phaseolus lunatus*), corn (*Zea mays*), lettuce (*Lactuca sativa*), mustard (*Brassica juncea*), and crabgrass (*Digitaria sanguinalis*) were planted in shallow flat-bed trays containing 2 to 3 inches of a loam soil. Within 24 hours after planting an aqueous-acetone solution of the compound being tested was sprayed on the soil at a rate of 8 pounds of active ingredient per acre. Test plants were maintained in a greenhouse and watered regularly for 2 weeks, after which time the phytotoxicity of the compound was recorded. Individual plant species were examined for percent kill and vigor. Untreated control plants were maintained in every test carried out.

Table I lists results of pre-emergence herbicidal testing:

Table I

| Compound of Example | Pre-emergence Evaluation of Compounds 8 lb/acre Test Plant Species | | | | |
|---|---|---|---|---|---|
| | Lima Beans | Corn | Lettuce | Mustard | Crabgrass |
| IV** | 100 | 30* | 100 | 100 | 100 |
| V | 100 | 70* | 100 | 100 | 100 |
| VI | 100 | 70* | 100 | 100 | 100 |
| VII | 100 | 70* | 100 | 100 | 100 |
| VIII | 100 | 0* | 100 | 100 | 100 |
| IX | 100 | 30* | 100 | 100 | 100 |
| | 100 | 100 | 100 | 100 | 100 |
| X | 100 | 100 | 100 | 100 | 100 |
| XI | 100 | 0 | 100 | 100 | 100 |
| XII | 100 | 0* | 100 | 100 | 100 |
| XIII | 80* | 0 | 100 | 100 | 100 |
| XIV | 80* | 0* | 80* | 100 | 100 |
| XV | 100 | 70* | 100 | 100 | 100 |
| XVI | 100 | 0* | 100 | 100 | 100 |
| XVII | 100 | 70* | 100 | 100 | 100 |
| XVIII | 50 | 0 | 100 | 100 | 30 |
| XIX | 100 | 70* | 100 | 100 | 100 |
| XX | 100 | 0 | 100 | 100 | 100 |
| XXI | 100 | 0 | 100 | 100 | 80* |
| XXII | 100 | 0 | 90* | 100 | 20 |
| XXIII | 100 | 70* | 100 | 100 | 80* |
| XXIV | 100 | 0 | 50 | 50 | 10 |
| XXV | 100 | 0 | 100 | 100 | 90* |

*Plants not dead were severely damaged and not expected to live.
**Data at 4 lbs/acre.

For post-emergence herbicidal tests the test crop seeds were planted in shallow flat-bed trays containing 2 to 3 inches of a loam soil. The growth trays were maintained in a greenhouse and regularly watered for approximately 2 weeks. When the first trifoliate leaves of bean plants were unfolding, the test plants were removed from the greenhouse and sprayed with an aqueous-acetone solution of the compound being tested at a rate of 8 pounds of acrive ingredient per acre. The plants were maintained in the greenhouse and watered regularly for an additional 2 weeks after which time the phytotoxicity of the compound was recorded. Individual plant species were examined for percent kill and vigor. Untreated control plants were maintained in every test carried out.

Table II lists the results of post-emergence herbicidal testing:

Table II

Post emergence Evaluation of Compounds at 8 lb/acre

| Compound of Example | Lima Beans | Corn | Lettuce | Mustard | Crabgrass |
|---|---|---|---|---|---|
| V | 100 | 100 | 100 | 100 | 100 |
| VI | 100 | 0* | 100 | 100 | 100 |
| VII | 100 | 100 | 100 | 100 | 100 |
| VIII | 100 | 70* | 100 | 100 | 100 |
| IX | 100 | 70* | 100 | 100 | 100 |
| X | 100 | 70* | 100 | 100 | 100 |
| XI | 100 | 70 | 100 | 100 | 100 |
| XII | 100 | 70* | 100 | 100 | 100 |
| XIII | 100 | 30 | 100 | 100 | 100 |
| XIV | 100 | 30* | 100 | 100 | 100 |
| XV | 100 | 100 | 100 | 100 | 100 |
| XVI | 100 | 30* | 100 | 100 | 100 |
| XVII | 80 | 0 | 100 | 100 | 100 |
| XVIII | 100 | 0 | 100 | 100 | 0 |
| XIX | 100 | 30* | 100 | 100 | 100 |
| XX | 100 | 0 | 100 | 100 | 100 |
| XXI | 100 | 0 | 100 | 100 | 50 |
| XXII | 0 | 0 | 60 | 70 | 30 |
| XXIII | 100 | 70 | 100 | 100 | 100 |
| XXIV | 0 | 0 | 100 | 50 | 20 |
| XXV | 50* | 30 | 100 | 100 | 100 |

*Plants not dead were severely damaged and not expected to live.

For herbicidal applications, 3,6-dialkylisoxazolo-[3,4-d]pyrimidin-4(5H)-ones may be utilized in diverse formulations, including the agricultural adjuvants and agricultural carriers, i.e. those materials normally employed to facilitate the dispersion of active ingredients in agricultural applications, recognizing the fact that the formation and mode of application of a toxicant may affect the activity of the material in a given application. Thus, the compound of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foilage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips or coarse talc. Particularly useful is a granule wherein a wettable powder is applied as a surface coating to a sand or other insoluble particle such that the wettable may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5 percent or as much as 95 percent of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5 percent to 80 percent of active ingredient, depending on the absorbency of the carrier, and usually also contain a small amount of a wetting, dispersing or emulsifying agent to facilitate dispersion. For example, a useful wettable powder formulation contains 80.8 parts of 3,6-dialkylisoxazolo[3,4-d]pyrimidin-4(5H)-one, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of the compound of this invention with a liquid or solid emulsifying agent, or may also contain an agriculturally acceptable liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 percent to 15 percent by weight of the herbicidal composition.

These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The active herbicidal compound of this invention may be formulated and/or applied with insecticides, fungicides, nematicides, plant-growth regulators, fertilizers, and other agricultural chemicals. In applying the active compound of this invention, whether formulated alone or with other agricultural chemicals, an effective amount and concentration of 3,6-dialkyl-isoxazolo[3,4-d]pyrimidin-4(5H)-one are of course employed.

It is apparent that various modifications may be made in the formulation and application of the novel compounds of this invention, without departing from the inventive concept herein, as defined in the following claims:

I claim:

1. An herbicidal composition containing, as active ingredient, an effective amount of a compound of the formula:

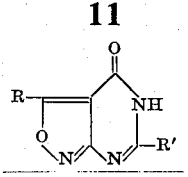

wherein R and R' are members of the group consisting of straight and branched alkyl radicals of 1 to 4 carbon atoms, in admixture with an agricultural carrier.

2. An herbicidal composition of claim 1 in which R is a member of the group consisting of methyl, ethyl, propyl, isopropyl and tert-butyl radicals; and R' is a member of the group consisting of isopropyl and tert-butyl radicals.

3. An herbicidal composition of claim 1 in which R is a member of the group consisting of isopropyl and tert-butyl radicals and R' is a member of the group consisting of methyl, ethyl, propyl, isopropyl and tert-butyl radicals.

4. An herbicidal composition of claim 1 in which the compound is 6-tert-butyl-3-propyl-isoxazolo[3,4-d]pyrimidin-4(5H)-one.

5. An herbicidal composition of claim 1 in which the compound is 6-tert-butyl-3-ethyl-isoxazolo[3,4-d]pyrimidin-4(5H)-one.

6. An herbicidal composition of claim 1 in which the compound is 6-ethyl-3-isopropylisoxazolo[3,4-d]pyrimidin-4(5H)-one.

7. An herbicidal composition of claim 1 in which the compound is 3,6-diisopropylisoxazolo[3,4-d]pyrimidin-4(5H)-one.

8. An herbicidal composition of claim 1 in which the compound is 6-tert-butyl-3-isopropylisoxazolo[3,4-d]pyrimidin-4(5H)-one.

9. An herbicidal composition of claim 1 in which the compound is 3-tert-butyl-6-methylisoxazolo[3,4-d]pyrimidin-4(5H)-one.

10. An herbicidal composition of claim 1 in which the compound is 3-tert-butyl-6-ethylisoxazolo[3,4-d]pyrimidin-4(5H)-one.

11. An herbicidal composition of claim 1 in which the compound is 3,6-di-tert-butylisoxazolo[3,4-d]pyrimidin-4(5H)-one.

12. A method of controlling undesired plant growth which comprises applying to the locus where control is desired an effective amount of a compound of the formula:

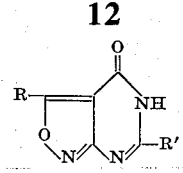

wherein R and R' are members of the group consisting of straight and branched alkyl radicals of 1 to 4 carbon atoms.

13. A method according to claim 12 in which R is a member of the group consisting of methyl, ethyl, propyl, isopropyl and tert-butyl radicals; and R' is a member of the group consisting of isopropyl and tert-butyl radicals.

14. A method according to claim 12 in which R is a member of the group consisting of isopropyl and tert-butyl radicals and R' is a member of the group consisting of methyl, ethyl, propyl, isopropyl and tert-butyl radicals.

15. A method according to claim 12 in which the compound is 6-tert-butyl-3-propylisoxazolo[3,4-d]pyrimidin-4(5H)-one.

16. A method according to claim 12 in which the compound is 6-tert-butyl-3-ethylisoxazolo[3,4-d]pyrimidin-4(5H)-one.

17. A method according to claim 12 in which the compound is 6-ethyl-3-isopropylisoxazolo[3,4-d]pyrimidin-4(5H)-one.

18. A method according to claim 12 in which the compound is 3,6-diisopropylisoxazolo[3,4-d]pyrimidin-4(5H)-one.

19. A method according to claim 12 in which the compound is 6-tert-butyl-3-isopropylisoxazolo[3,4-d]pyrimidin-4(5H)-one.

20. A method according to claim 12 in which the compound is 3-tert-butyl-6-methylisoxazolo[3,4-d]pyrimidin-4(5H)-one.

21. A method according to claim 12 in which the compound is 3-tert-butyl-6-ethylisoxazolo[3,4-d]pyrimidin-4(5H)-one.

22. A method according to claim 12 in which the compound is 3,6-di-tert-butylisoxazolo[3,4-d]pyrimidin-4(5H)-one.

* * * * *

UNITED STATES PATENT OFFICE
CERTIFICATE OF CORRECTION

Patent No. 3,859,075          Dated January 7, 1975

Inventor(s) Loren Kenneth Gibbons

It is certified that error appears in the above-identified patent and that said Letters Patent are hereby corrected as shown below:

Title page: title, first word should be ---ISOXAZOLOPYRIMIDINE---

Column 1, line 1, title, first word should be --ISOXAZOLOPYRIMI-DINE --.

Column 4, lines 46-47 should read:

---Analysis: Calc'd for $C_7H_9N_3O$: C 55.62; H 6.00; N 27.80;

Found: C 55.12; H 6.30; N 27.32.---

Column 8, Table I, second line of results for "Compound of Example IX" should be deleted.

Column 9, word bridging lines 49-50 should be ---foliage---.

Signed and Sealed this second Day of December 1975

[SEAL]

Attest:

RUTH C. MASON
Attesting Officer

C. MARSHALL DANN
Commissioner of Patents and Trademarks